United States Patent [19]

Fingerle

[11] Patent Number: 4,991,906
[45] Date of Patent: Feb. 12, 1991

[54] CAB SKIRT FAIRING MOUNTING FOR BELOW A TRUCK SLEEPER BOX

[75] Inventor: Robert F. Fingerle, Fremont, Calif.

[73] Assignee: Paccar Inc., Bellevue, Wash.

[21] Appl. No.: 398,659

[22] Filed: Aug. 25, 1989

[51] Int. Cl.[5] ............................................. B62D 35/00
[52] U.S. Cl. ................................. 296/180.2; 280/164.1
[58] Field of Search .......................... 296/180.1, 180.2; 280/164.1

[56] References Cited

U.S. PATENT DOCUMENTS

| | | | |
|---|---|---|---|
| 3,711,146 | 1/1973 | Madzsar et al. | 296/180.2 |
| 4,611,847 | 9/1986 | Sullivan | 296/180.2 |
| 4,746,160 | 5/1988 | Weisemeyer | 296/180.2 |
| 4,750,772 | 6/1988 | Haegert | 296/180.2 |
| 4,836,568 | 6/1989 | Preslik et al. | 296/180.1 |

Primary Examiner—Robert R. Song
Attorney, Agent, or Firm—Flehr, Hohbach, Test, Albritton & Herbert

[57] ABSTRACT

The present invention teaches a novel manner of mounting a fairing panel which covers the area beneath the sleeper box of a truck so that the fairing panel experiences minimal impact and stress from surrounding cab skirt fairing panels and other truck chassis components. The distal region of the panel is fixedly secured by a bolt and nut rigid assembly connected to the sleeper steps, the sleeper steps, in turn, are fixedly secured by a bolt and nut rigid assembly to the bottom of the sleeper box assembly. The proximate region of the panel is secured by a pair of flexible assemblies each comprising a bolt, a flexible spacer, and a nut. The two flexible assemblies serve to isolate other regions of the truck from the motion of the mounted fairing panel by absorbing the variety of forces imposed upon the mounting fairing panel. In addition, the two flexible assemblies serve to isolate the panel from the motion of truck chassis components.

7 Claims, 3 Drawing Sheets

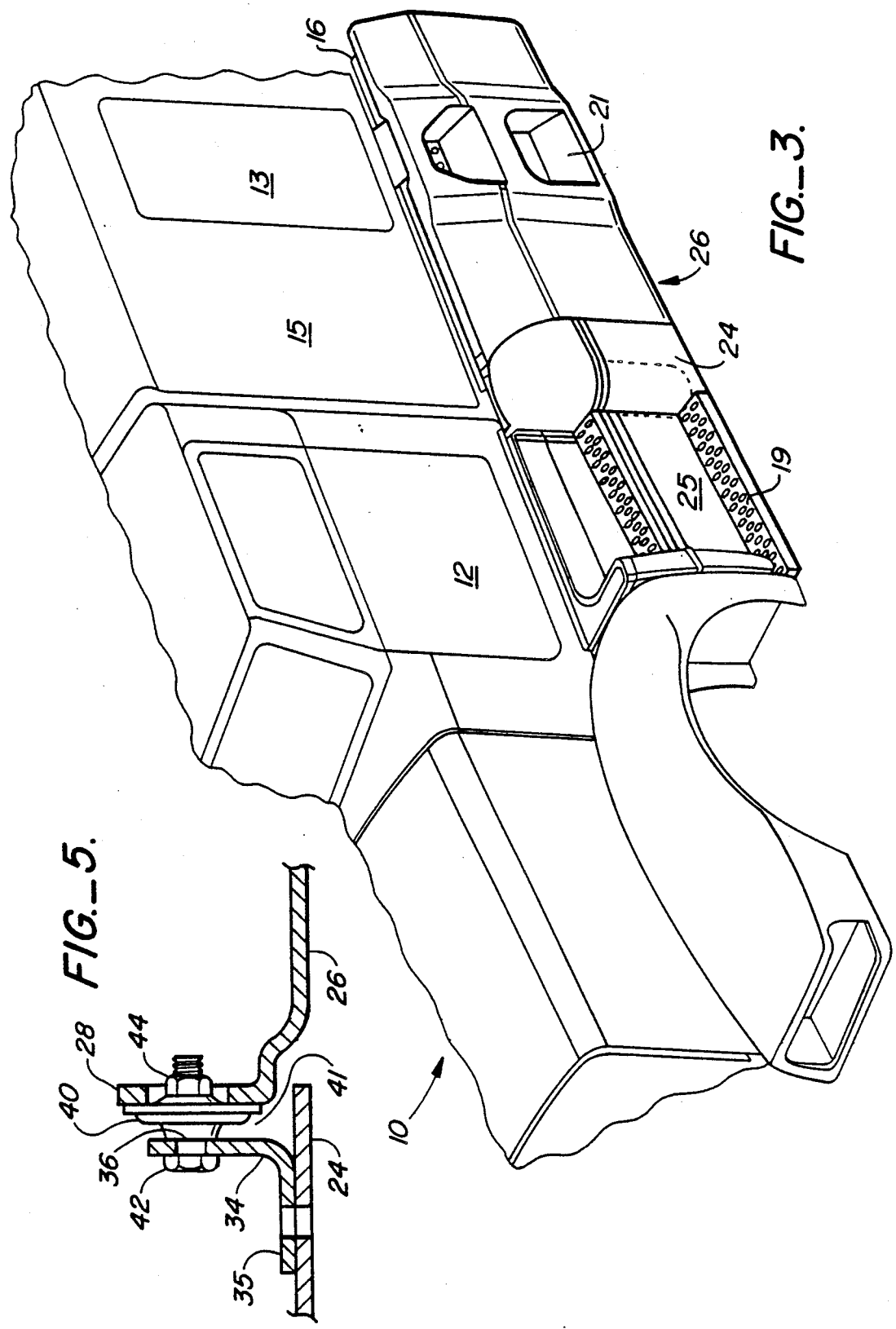

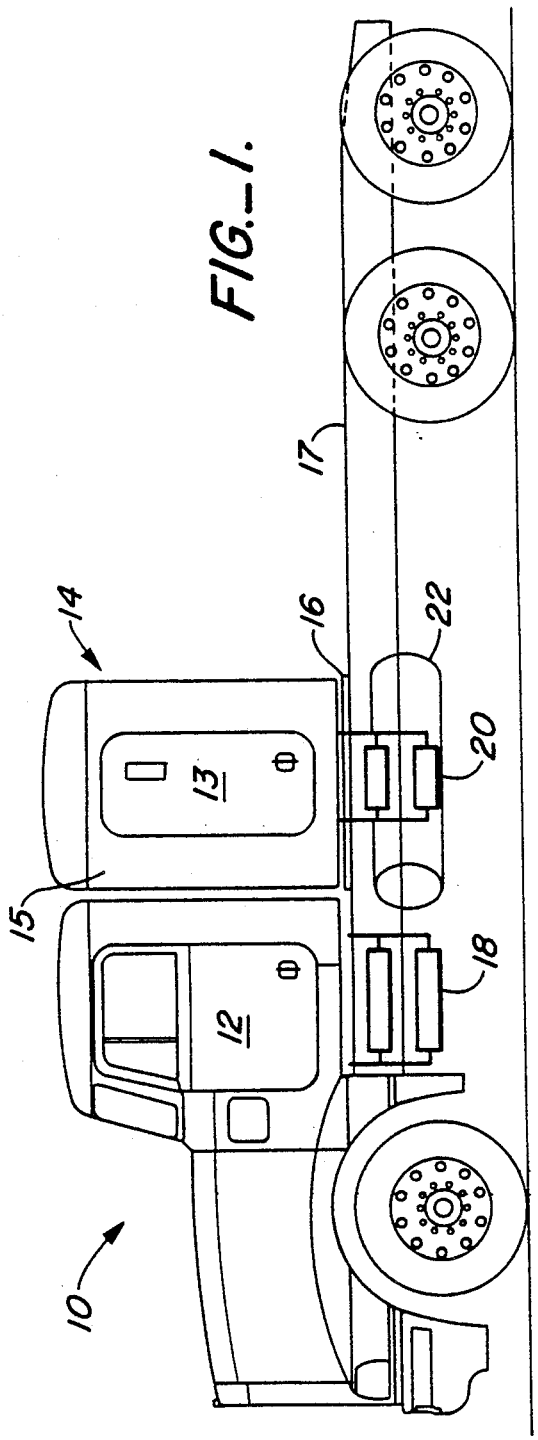
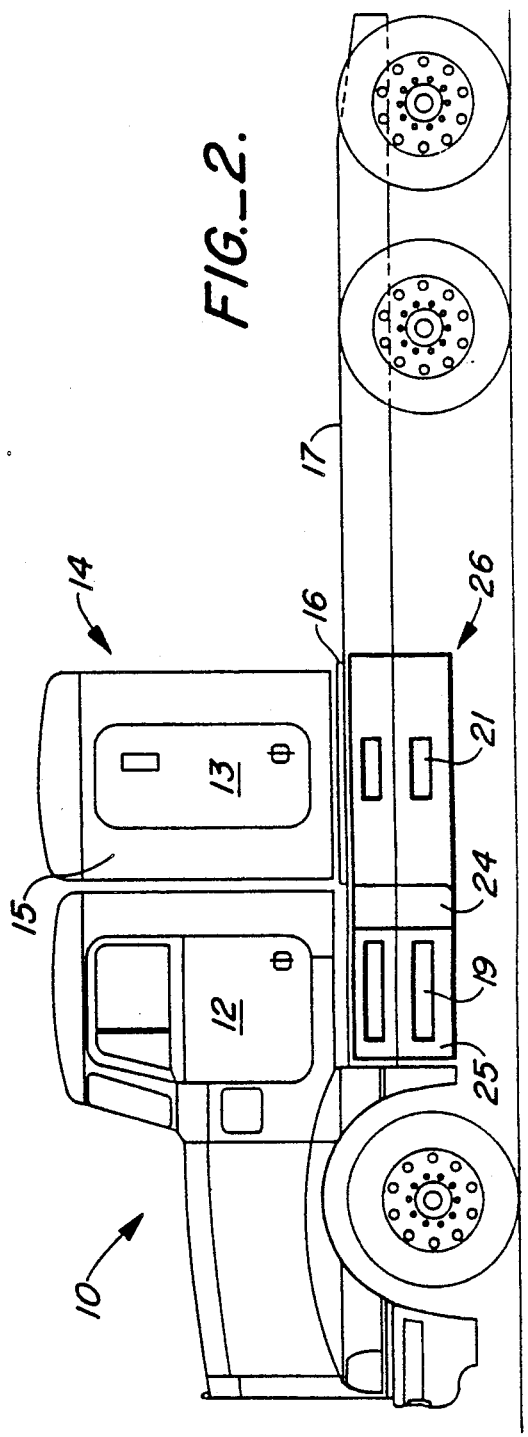

CAB SKIRT FAIRING MOUNTING FOR BELOW A TRUCK SLEEPER BOX

BRIEF DESCRIPTION OF THE INVENTION

This invention relates generally to a mounting for an aerodynamic cab skirt fairing for trucks with a sleeper box. More particularly, it relates to a novel manner for mounting a fairing panel which covers the area beneath the sleeper box so that the fairing panel experiences minimal stress from the motion of truck chassis components.

BACKGROUND OF THE INVENTION

All trucks include a driver's cab, or cab, from which the truck's driver operates the vehicle. Many trucks include a sleeper box, or sleeper, positioned behind the cab. The sleeper is a separate compartment typically large enough to house a bed or bunk and thereby functions as a sleeping or resting place. The sleeper typically has a door on the driver's side of the vehicle and a step assembly directly below it. The step assembly is commonly mounted on a fuel tank. The opposite side of the truck commonly includes a fuel tank without a step assembly. The truck cab has a pair of doors, beneath each door is a step assembly.

The step assemblies and fuel tanks create air turbulence and thereby reduce fuel efficiency. Moreover, they are unsightly. One way of streamlining this section of the truck has been disclosed in a prior art truck which incorporates a cab skirt fairing assembly which extends all the way across the spaces between its step arrangements, fender and fuel tanks.

The aforementioned prior art truck does not address an integral problem associated with a cab skirt fairing which extends to cover the region below the sleeper. In such a situation, the cab skirt must be attached at different positions along the length of the truck. Thus, while the truck is in motion, the cab skirt will be exposed to a variety of destructive forces. For instance, if the truck collides with an object on the road, say a pot hole, the frame of the truck will twist, compelling a twisting of a fairing panel. That is, there will be a twisting action between the region of the fairing panel connected near the cab and the region of the fairing panel connected near the sleeper. In particular, the twisting occurs along the longitudinal axis of the truck and in a direction perpendicular to the longitudinal axis.

Another type of destructive force is that which results when panels are exposed to differential forces in a direction perpendicular to the road. This familiar up-down motion of a truck tends to compel a twisting and vibrating of the fairing panel.

Another problem arises from the need for having the fairing panel fixedly attached at its distal end. Since the fairing panel is connected to the step, the panel must withstand any motion imparted to the step. This fixed attachment also results in the destructive consequences associated with the panel being forced to absorb the vibrations of the object to which the panel is connected.

These individual forces act cumulatively to damage, and eventually destroy, the connected fairing panels which make up the cab skirt.

OBJECTS AND SUMMARY OF THE INVENTION

It is a general object of the present invention to provide a cab skirt fairing mounting for a fairing panel placed in the region below the sleeper box of a truck.

A particular object of the present invention is to provide a cab skirt fairing mounting which is used to securely affix a fairing panel at its distal end so as to support a person's weight.

Another particular object of the present invention is to provide a flexibly affixed cab skirt fairing mounting for the proximate end of a fairing panel in order to absorb the motion of the panel.

Still another object of the present invention is to utilize the mountings for the purpose of isolating the motion of the cab skirt fairing panel so as to minimize impact between surrounding cab skirt fairing panels and other truck chassis components.

The foregoing and other objects are achieved by a multi-point mounting for a cab skirt fairing panel which covers the region below the sleeper box of a truck. The distal region of the panel is fixedly secured by a bolt and nut rigid assembly connected to the sleeper steps. The sleeper steps, in turn, are fixedly secured by a bolt and nut rigid assembly to the top of the sleeper box assembly. This connection rigidly attaches the panel to the sleeper box assembly. As a result, the panel is exposed to, and thus moves with, the prevalent force at this region of the panel—a force perpendicular to the road. The proximate region of the panel is secured to a second, supported fairing panel by a pair of flexible assemblies each comprising a bolt, a spacer, and a nut. The two flexible assemblies serve to isolate other regions of the truck from the motion of the mounted fairing panel. That is, the flexible assemblies largely absorb the variety of forces imposed upon the mounted fairing panel.

BRIEF DESCRIPTION OF THE DRAWINGS

Other objects and advantages of the invention will become apparent upon reading the following detailed description and upon reference to the drawings, in which:

FIG. 1 is a side view of a truck with a sleeper box wherein the steps leading to the sleeper box, along with the fuel tank upon which they are mounted, and the steps leading to the cab, constitute air flow obstructions.

FIG. 2 is a side view of a truck with a sleeper box wherein the steps leading to the sleeper box, the fuel tank, and the steps leading to the cab are covered by an aerodynamic cab skirt fairing assembly.

FIG. 3 is an enlarged side view of the truck of FIG. 2 more particularly depicting the cab skirt fairing assembly extending below the sleeper box.

FIG. 5 is a top view along the line 5—5 of FIG. 4 depicting the flexible connection means between two panels of the cab skirt fairing assembly.

Figure 4:
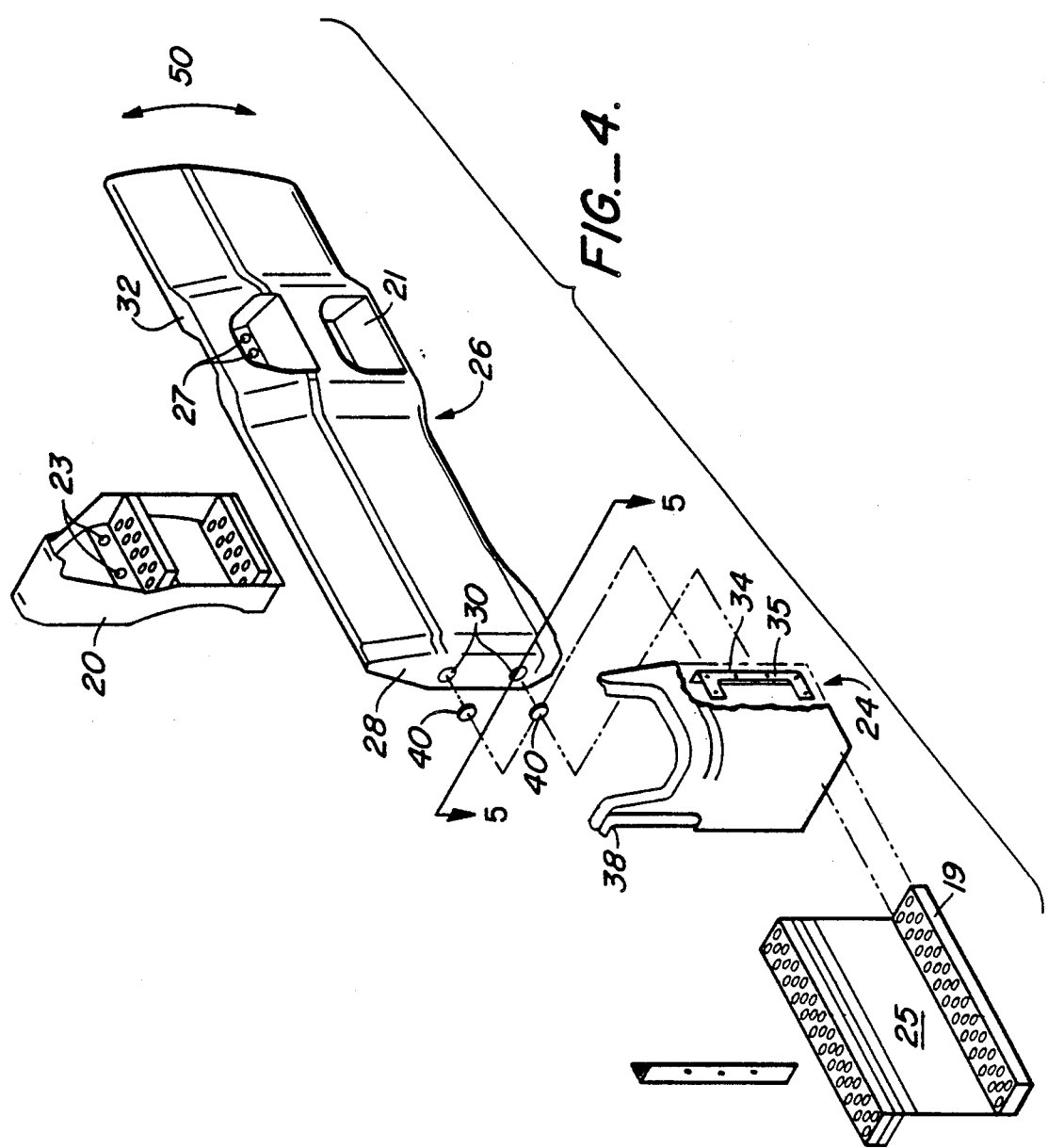
FIG. 4 is a detailed exploded view of a portion of the cab skirt fairing assembly depicted in FIG. 3, specifically depicting the sleeper box steps, the sleeper box fairing assembly, the curved fairing panel and the cab steps.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Referring to FIG. 1, wherein like components are designated by like reference numerals in the various figures, a truck 10 is depicted. The truck 10 includes a cab 12 and a sleeper box assembly 14. The sleeper box assembly 14 includes a sleeper box 15, also called a sleeper, a sleeper box entry door 13, and a sleeper box support frame 16. The sleeper box support frame 16 may be any means well known in the art for securely attaching the sleeper box to the truck bed frame 17. In the alternative, the sleeper box assembly 14 may be directly mounted on the truck bed frame 17, without the use of a support frame 16, such methods are also well-known in the art. A fuel tank 22 is positioned beneath the sleeper box assembly 14. Sleeper box steps 20 are mounted on the fuel tank 22 and thereby provide access to the sleeper box 15. The method for mounting the sleeper box steps 20 on the fuel tank 22 is well known in the art. Alternatively, the sleeper box steps 20 may be mounted without utilizing the fuel tank 22. Such methods are also well known in the art. FIG. 1 also includes cab steps 18 providing access to cab 12.

As can be appreciated in viewing FIG. 1, the cab steps 18, the sleeper steps 20, and the fuel tank 22 represent obstruction to efficient airflow. Thus, the need to alleviate this problem is obvious. However, it is witnessed that the sleeper steps 20, and the fuel tank 22, positioned toward the middle of the truck bed frame 17, will be exposed to forces different from those experienced by the cab steps 18 positioned near the front wheels and the engine. Consequently, it is clear that in order to successfully cover an area of such length, the counteractive motions along that length must be accommodated.

Turning to FIG. 2, the truck 10 is once again depicted. However, in FIG. 2 there is shown an aerodynamic cab skirt fairing assembly. This assembly includes a step fairing panel 25 which includes step fairing panel steps 19 in lieu of the cab steps 18 depicted in FIG. 1. Also included in the assembly is a curved fairing panel 24 and a sleeper box fairing panel 26. Sleeper box steps 20, and fuel tank 22 of FIG. 1 are concealed behind the sleeper box fairing panel 26. The sleeper box fairing panel 26 includes sleeper box fairing panel step apertures 21 for access to the presently concealed sleeper box steps 20 of FIG. 1. The sleeper box fairing panel on the opposite side of the truck does not include sleeper box fairing panel step apertures, otherwise it is identical. The sleeper box fairing panels on either side of the truck are mounted in the same manner, in accordance with the invention, as to be described herein.

FIG. 3 more fully reveals the nature of the cab skirt fairing assembly. Step fairing panel 25 is seen to be a discrete panel positioned adjacent to curved fairing panel 24. Curved fairing panel 24 is also positioned next to sleeper box fairing panel 26. Sleeper box fairing panel step apertures 21 are clearly revealed in FIG. 3.

While the exterior appearance of the cab skirt fairing assembly is fully appreciated from the foregoing figures, the inherent problems associated with mounting such a structure have not been addressed. Particular attention now turns to the difficulty of mounting a unitary structure along the length of a truck where different motions act along that length. Specifically, the problem of isolating the motion and resultant forces of the cab skirt fairing panel 26 from other counter active forces is addressed in reference to the present invention.

Turning to FIG. 4, the individual components of the cab skirt fairing assembly are depicted in their disassembled form, better revealing the present invention. Step fairing panel 25 and the step fairing panel steps 19 are in the proximate region of the figure. Curved fairing panel 24 is also depicted. This panel 24 includes a curved fairing proximate flange member 38. At its distal end, panel 24 preferably includes a connected member 35 attached to the panel 24 and forming a flange with a front surface 34. The flange member surface 34 includes distal flange member apertures 36, as best seen in FIG. 5.

As depicted by the dotted lines of FIG. 4, the curved fairing panel 24 lines up with the sleeper box fairing panel 26. More particularly, a proximate flange member 28 of the sleeper box fairing panel 26 includes proximate flange member apertures 30 align with the distal flange member apertures 36 of curved fairing panel 24. The nature of the connection between the flanged members, of these two panels, which is provided in accordance with the present invention, will be discussed below. The remainder of the figure reveals sleeper box fairing panel step apertures 21 which provide access to sleeper steps 20, which from their removed position in the figure, are seen to be similarly proportioned. Arrow 50 depicts the motion perpendicular to the road which the panel typically experiences.

Finally, top flange member 32, in a preferred embodiment, is seen to traverse the length of the sleeper box fairing panel from the proximate flange member 28 to the distal end of the panel. This top flange, member is positioned beneath the sleeper box assembly 14; it is fixedly connected to the sleeper box assembly with a bolt which preferably advances from the sleeper box assembly into the top flange member 32 and is then secured with a nut. Preferably, the bolt enters the top flange member 32 above the step apertures 21.

In a preferred embodiment, the sleeper box fairing panel 26 is connected to the sleeper steps 20. This connection is realized by aligning the fairing panel mounting apertures 27 with the apertures 23 of the sleeper steps 20. Once aligned, the fairing panel 26 can be rigidly bolted to the sleeper steps 20. The sleeper steps 20, in turn, are mounted through their top to the sleeper box assembly 14. The fairing panel's response to motion is effectively the same in either embodiment. In either embodiment, the motion depicted by arrow 50 originates as movement of the truck's main frame is transferred to the fairing panel through the steps or sleeper box assembly.

The sleeper box fairing panel 26 on the opposite side of the truck is secured in the same manner. Instead of sleeper steps 20, a mounting frame is utilized. Preferably, this frame, as the sleeper steps, supports mounting apertures for connection through the fairing panel. At its top, the frame is connected to the sleeper box assembly 14. In the alternative, the fairing panel 26 can be directly bolted to the sleeper box assembly 14, as previously described.

Turning to FIG. 5, the connection between the curved fairing panel 24 and the sleeper box fairing panel 26 is viewed from above, along the cross-section 5—5 of FIG. 4. As described above, the curved fairing distal flange member surface 34 is aligned with proximate flange member 28 of the sleeper box fairing panel 26.

More particularly, as described above, the apertures of the two flange members are aligned thereby allowing the insertion of a bolt 42 which is connected at its opposite end by a nut 44.

In accordance with the present invention, the bolt 42 couples flange member surface 34 to flange member 28 and is then secured by a nut 44, with a flexible mounting spacer 40 therebetween such that when the flexible mount is in its relaxed state (not compressed) a space 41 is present between the flanges.

The flexible mounting spacer 40 is preferably formed of a durable rubber. It provides a means for attaching the individual panels of the cab skirt while providing flexibility between the panels. For instance, it can be appreciated by one skilled in the art that the flexible mounting spacer 40 will provide for flexible response of the sleeper box fairing panel to motion in the direction depicted by arrow 50 of FIG. 4. It does this by compressing and expanding in response to the motion of fairing panel 26 at its distal end, allowing the proximate end of the fairing to move in a more or less arcuate manner into and out of space 41 without ever engaging panel 24. In providing for such flexible response of the sleeper box fairing panel, the flexible mounting spacer 40 insures that this response is largely isolated to that panel and thus the curved fairing panel 24 will not be subject to the same motion.

It should be appreciated that FIG. 5 only depicts a single bolt while in a preferred embodiment two such bolt arrangements are present. This feature is exhibited in FIG. 4.

Thus it is apparent that there has been provided, in accordance with the invention, a cab skirt fairing mounting apparatus that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. An assembly for mounting a sleeper box fairing panel beneath the entry door of a sleeper box assembly supported on the bed frame of a truck, said assembly comprising:
    means for fixedly mounting said sleeper box fairing panel to one of said bed frame of said truck and said sleeper box assembly, such that when stepped upon by a person entering said sleeper box assembly through said entry door, said sleeper box fairing panel can withstand any excess force created by said person's weight; and
    means for flexibly securing the proximate end of said sleeper box fairing panel to a separate member, such that said separate member is substantially isolated from vibrations transferred to said panel while said truck is in motion, as a result of said sleeper box fairing panel being fixedly mounted to one of said bed frame and said sleeper box assembly.

2. The assembly of claim 1 wherein,
    said first-mentioned means includes a step assembly mounted to one of said bed frame and said sleeper box assembly, said step assembly including bolting means for coupling said step assembly to said sleeper box fairing panel.

3. The assembly of claim 1 wherein,
    said first mentioned means includes bolting means coupling said one of said bed frame and said sleeper box assembly to a flange positioned at the top of said sleeper box fairing panel.

4. The assembly of claim 1 wherein said separate member and the proximate end of said panel include adjacent, confronting flanges, and wherein said securing means includes resilient spacer means and means for positioning said spacer means between and against said flanges so as to provide a space therebetween, whereby the proximate end of said panel can move into and out of said space without substantially engaging said separate member.

5. The assembly of claim 4 wherein said spacer means includes a resilient spacer located between said confronting flanges and wherein said positioning means includes bolt means for securing said spacer between said confronting flanges.

6. The assembly of claim 5 wherein said spacer means includes two spacers and wherein said positioning means includes bolt means for each spacer.

7. A sleeper box fairing panel assembly for mounting to a truck having a bed frame and a sleeper box assembly mounted on said bed frame, said fairing panel assembly comprising:
    a sleeper box fairing panel formed for mounting beneath a side entry door of said sleeper box assembly;
    mounting means provided on said sleeper box fairing panel for fixedly mounting said sleeper box fairing panel to one of said bed frame and said sleeper box assembly, such that when stepped upon by a person entering said sleeper box assembly through said entry door, said sleeper box fairing panel can withstand any excess force created by said person's weight; and
    mounting means provided on said sleeper box fairing panel for flexibly securing a forward end of said sleeper box fairing panel to a separate member, such that said separate member is substantially isolated from vibrations transferred to said sleeper box fairing panel while said truck is in motion as a result of said sleeper box fairing panel being fixedly mounted to one of said bed frame and said sleeper box assembly by the first-named mounting means.

* * * * *